(12) United States Patent
Venanzi et al.

(10) Patent No.: US 11,775,493 B2
(45) Date of Patent: Oct. 3, 2023

(54) INFORMATION RETRIEVAL SYSTEM

(71) Applicant: Microsoft Technology Licensing, LLC, Redmond, WA (US)

(72) Inventors: Matteo Venanzi, London (GB); Katja Hofmann, Cambridge (GB); Filip Andrzej Radlinski, London (GB); Brian Brost, Copenhagen (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/449,957

(22) Filed: Mar. 4, 2017

(65) Prior Publication Data

US 2018/0157691 A1 Jun. 7, 2018

(30) Foreign Application Priority Data

Dec. 6, 2016 (GB) ...................................... 1620714

(51) Int. Cl.
*G06F 16/22* (2019.01)
*G06F 16/24* (2019.01)
*G06F 16/31* (2019.01)
*G06F 16/2452* (2019.01)

(52) U.S. Cl.
CPC .... *G06F 16/2228* (2019.01); *G06F 16/24522* (2019.01); *G06F 16/31* (2019.01)

(58) Field of Classification Search
None
See application file for complete search history.

(56) References Cited

U.S. PATENT DOCUMENTS

| | | | |
|---|---|---|---|
| 6,438,562 B1* | 8/2002 | Gupta | G06F 16/2272 707/696 |
| 6,498,921 B1* | 12/2002 | Ho | G09B 5/00 434/118 |
| 6,895,405 B1* | 5/2005 | Choi | G06Q 30/02 706/45 |

(Continued)

FOREIGN PATENT DOCUMENTS

| | | |
|---|---|---|
| CN | 105760417 A | 7/2016 |
| WO | 2014035709 A1 | 3/2014 |

OTHER PUBLICATIONS

Jeffrey Bigham; VizWiz: Nearly Real-time Answers to Visual Questions; ACM; 2010; pp. 333-342 (Year: 2010).*

(Continued)

*Primary Examiner* — Albert M Phillips, III
*Assistant Examiner* — Jermaine A Mincey
(74) *Attorney, Agent, or Firm* — Barta, Jones & Foley, PLLC

(57) ABSTRACT

In various examples there is an information retrieval system which has a memory storing an index of items, each item having one or more features of a plurality of features. The index includes, for each item, an indication of the features of that item; and is configured at least according to the features. The memory stores a plurality of questions about the features of the items. The information retrieval system has a question selector that selects at least one of the questions on the basis of at least an expected information gain of the question with respect to the items. A search component searches the index using answers to the selected questions received from a user.

20 Claims, 11 Drawing Sheets

(56) References Cited

U.S. PATENT DOCUMENTS

| | | | |
|---|---|---|---|
| 7,966,282 | B2 | 6/2011 | Pinckney et al. |
| 8,204,751 | B1 | 6/2012 | Di Fabbrizio et al. |
| 8,606,860 | B2 | 12/2013 | Chang et al. |
| 9,342,566 | B2 | 5/2016 | Reddy et al. |
| 9,424,233 | B2 | 8/2016 | Barve et al. |
| 10,043,410 | B1* | 8/2018 | Swank .................... G09B 7/08 |
| 2007/0214131 | A1* | 9/2007 | Cucerzan .............. G06F 16/951 |
| 2007/0288576 | A1 | 12/2007 | Illg |
| 2009/0234647 | A1 | 9/2009 | Scholz et al. |
| 2010/0063878 | A1 | 3/2010 | Bachet et al. |
| 2010/0287241 | A1 | 11/2010 | Swanburg et al. |
| 2014/0282870 | A1* | 9/2014 | Markwordt ............. H04L 63/08 726/3 |
| 2015/0019228 | A1 | 1/2015 | Akolkar et al. |
| 2015/0227520 | A1* | 8/2015 | Clark .................. G06F 16/9535 707/725 |
| 2015/0264023 | A1* | 9/2015 | Reno ...................... H04L 63/08 726/7 |
| 2015/0363485 | A1* | 12/2015 | Bennett ............... G06F 16/3325 707/694 |
| 2016/0125035 | A1 | 5/2016 | Hanson et al. |
| 2016/0217701 | A1* | 7/2016 | Brown ..................... G09B 7/00 |
| 2017/0371956 | A1* | 12/2017 | Allen .................. G06F 16/3329 |

OTHER PUBLICATIONS

Briggs, Justin, "Talking Back To Conversational Search", https://www.briggsby.com/talking-back-to-conversational-search/, Published on: Nov. 17, 2014, 18 pages.

Goker, et al., "Personalized Conversational Case-Based Recommendation", In Proceedings of Advances in Case-Based Reasoning, 5th European Workshop, Sep. 6, 2000, 12 pages.

Mahmood, et al., "Improving Recommender Systems with Adaptive Conversational Strategies", In Proceedings of the 20th ACM conference on Hypertext and hypermedia, Jun. 29, 2009,, pp. 73-82.

Dredze, et al., "Suggesting Email View Filters for Triage and Search", In Proceedings of the 21st international joint conference on Artificial intelligence, Jul. 11, 2009, 6 pages.

Agrawal, et al., "Thompson sampling for contextual bandits with linear payoffs", In Proceedings of the 30th International Conference on Machine Learning, Jun. 16, 2013, 9 pages.

Christakopoulou, et al., "Towards conversational recommender systems", In Proceedings of the 22nd ACM SIGKDD International Conference on Knowledge Discovery and Data Mining, Aug. 13, 2016, pp. 815-824.

Cox, et al., "The Bayesian Image Retrieval System, Pichunter: Theory, Implementation, and Psychophysical Experiments", In Journal of IEEE Transactions on Image Processing, vol. 9, Issue 1, Jan. 2000, pp. 20-37.

Elsweiler, et al., "What Makes Re-Finding Information Difficult? A Study of Email Re-Finding", In Proceedings of the 33rd European conference on Advances in information retrieval, Apr. 18, 2011, pp. 1-12.

Elsweiler, et al., "Understanding Refinding Behavior in Naturalistic Email Interaction Logs", In Proceedings of the 34th international ACM SIGIR conference on Research and development in Information Retrieval, Jul. 24, 2011, 10 pages.

Harvey, et al., "Exploring query patterns in email search", In Proceedings of the 34th European conference on Advances in Information Retrieval, Apr. 1, 2012, pp. 1-12.

Maarek, Yoelle, "Is mail the next frontier in search and data mining?", In Proceedings of the Ninth ACM International Conference on Web Search and Data Mining, Feb. 22, 2016, pp. 203.

Thompson, et al., "A personalized system for conversational recommendations", In Journal of Artificial Intelligence Research, vol. 21, Issue 1, Mar. 2004, 36 pages.

"International Search Report and Written Opinion Issued in PCT Application No. PCT/US2017/064387", dated Feb. 15, 2018, 12 Pages.

"Office Action Issued in Indian Patent Application No. 201917021583", dated Dec. 6, 2021, 6 Pages.

"First Office Action and Search report Issued in Chinese Patent Application No. 201780075501.8", dated Aug. 24, 2022, 25 Pages.

"Second Office Action Issued in Chinese Patent Application No. 201780075501.8", dated Feb. 15, 2023, 23 Pages.

"Office Action Issued in Chinese Patent Application No. 201780075501.8", dated Jun. 1, 2023, 23 Pages.

* cited by examiner

INFORMATION RETRIEVAL SYSTEM

CROSS-REFERENCE TO RELATED APPLICATION(S)

This non-provisional utility application claims priority to GB patent application number 1620714.4 entitled "INFORMATION RETRIEVAL SYSTEM" and filed on Dec. 6, 2016, which is incorporated herein in its entirety by reference.

BACKGROUND

Information retrieval is a complex engineering task especially as the quantity of items to be searched is continually increasing and yet the demands of end users to retrieve relevant items grows and increasingly involves using small resource constrained devices such as smart watches, augmented reality computing devices, smart phones and other electronic devices.

Often users find it hard to recall specific facts that might be useful to retrieve particular items. This is a problem both in the case of general web search, and also in the case of search facilities provided as part of an operating system, email client, or other software application for searching collections of personal items. Where search facilities for searching collections of personal items are used on mobile devices or other resource constrained devices it is especially difficult for end users to retrieve particular items.

The reader has probably experienced frustration when trying to retrieve a particular email from his or her personal collection of emails for example, when the reader cannot accurately recall facts about the email. Searching for items in personal collections such as personal collections of emails, blog posts, text messages, files, images and other content items is often time consuming and burdensome for the end user. To succeed efficiently with current search systems that search personal collections of items a user needs to understand advanced query syntax and this is a significant hurdle for many users.

The embodiments described below are not limited to implementations which solve any or all of the disadvantages of known information retrieval systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is an information retrieval system which has a memory storing an index of items, each item having one or more features of a plurality of features. The index includes, for each item, an indication of the features of that item; and is configured at least according to the features. The memory stores a plurality of questions about the features of the items. The information retrieval system has a question selector that selects at least one of the questions on the basis of at least an expected information gain of the question with respect to the items. A search component searches the index using answers to the selected questions received from a user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although some of the present examples are described and illustrated herein as being implemented in an email search system, the system described is provided as an example and not a limitation. As those skilled in the art will appreciate, the present examples are suitable for application in a variety of different types of information retrieval systems including both general web search and search of personal collections such as personal collections of email, images, files, blog posts, and other items.

Figure 1:
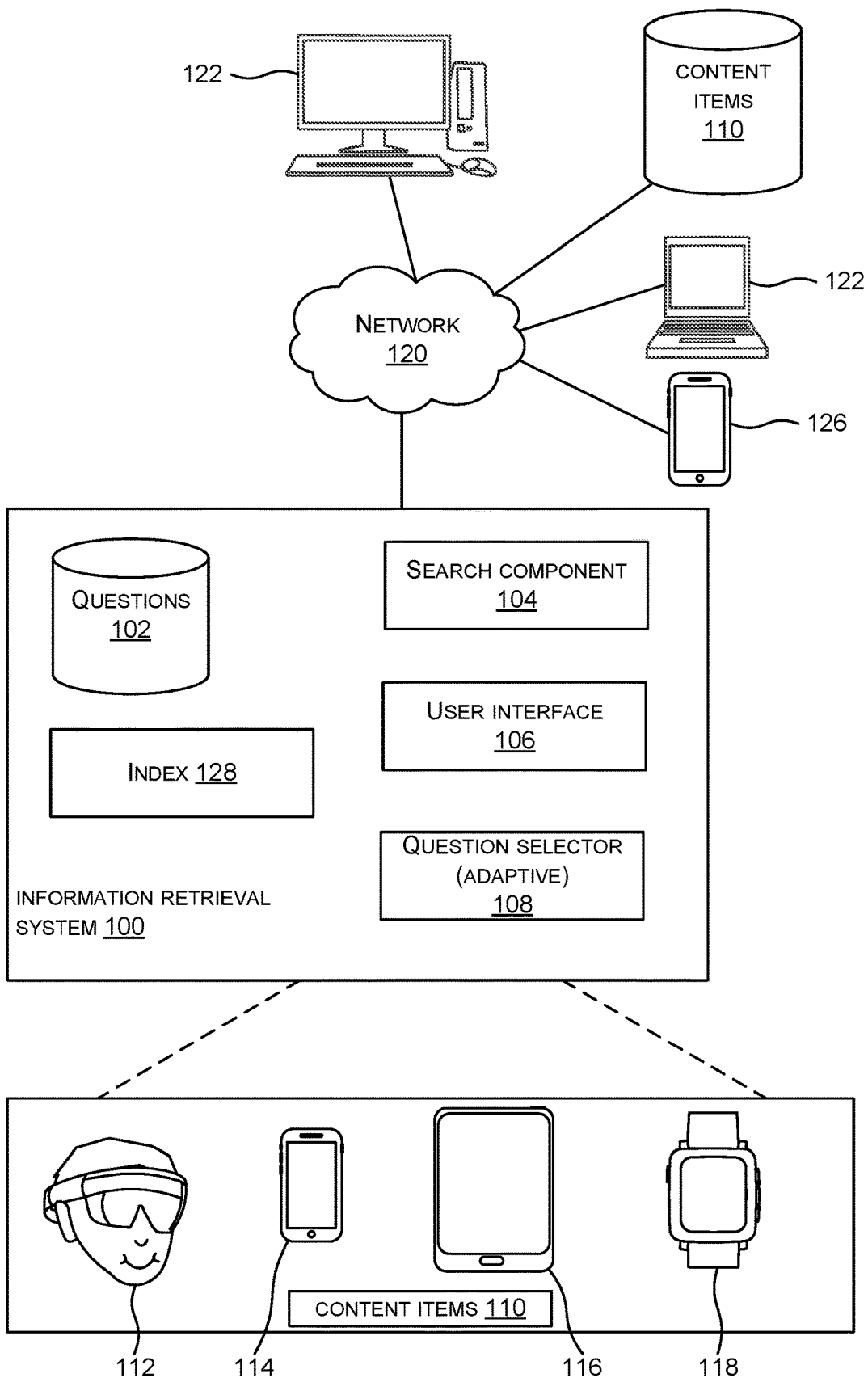
FIG. 1 is a schematic diagram of an information retrieval system 100 deployed either as part of a search engine or on an end user device.

FIG. 1 is a schematic diagram of an information retrieval system 100 which is deployed as a cloud service and/or as part of an operating system or software application at an end user computing device such as augmented reality computing device 112, smart phone 114, tablet computer 116, smart watch 118 and other end user computing devices. In the case that the information retrieval system 100 provides a cloud service it is accessible to end user computing devices such as desktop computer 122, laptop computer 124 and smart phone 126 over a communications network 120 such as the internet, an intranet or any other communications network.

The information retrieval system retrieves items or references or addresses of items where those items are any content items 110. A non-exhaustive list of examples of content items is: email, image, video, file, blog post, text message, document. The content items are either general items such as may be found through general web search, or are personal content items. Personal content items are associated with a particular user, for example, by virtue of being authored by that user or having been received or edited by that user. However, it is not essential for the content items to be user-specific, personal content items. The items are located at the end user computing device and/or at entities in communication with the end user computing device over a communications network 120 such as the internet, an intranet or any other communications network.

The information retrieval system comprises a memory 102 storing a plurality of questions, a search component 104, a user interface 106, a question selector 108 and an index 128. The information retrieval system 100 is computer implemented using any one or more of: software, hardware, firmware.

The questions stored in memory 102 are about the items 110 and these questions are pre specified in some cases or are automatically created using templates and/or using a generative machine learning model or in other ways. In some cases the questions are generated using a generative machine learning model. In this case the information retrieval system comprises a generative machine learning model for generating the questions which are then stored in memory 102. Each item has one or more features such as part of an address of the item, a time associated with creation of the item or other features. In some cases the questions can be answered with yes/no/don't know answers but this is not essential as the questions may have potential answers which are ratings, or categories or other types of answer which are not yes/no/don't know answers. In an example for search in a personal collection of emails, the features are:

Whether the email was sent within the last day

Whether the email was sent by the user (who owns the personal collection of emails)

Whether the email was sent within the last week

Whether the email was sent specifically to the user

Whether the email was sent within the last month

Whether the email was sent with the user on carbon copy (cc)

Whether the email was sent by one of the user's top three most frequent senders.

Where the questions are automatically generated, it is possible to make the questions bespoke to a particular user's collection of items. For example, given a plurality of possible types of question, instances of these types of question are generated using features from the particular user's collection of items. Statistics describing the user's collection of items are computed, such as most frequent email senders, most frequently accessed images, or other statistics and these are used to create instances of the question types.

In some examples, information about probabilities associated with the questions is also stored in memory 102. The probabilities are described in more detail below. In some examples the probabilities comprise, for each individual question, a probability that a particular user can answer that question. In some cases the probabilities comprise, for each individual question, a probability that any user can answer that question. In some examples the probabilities are learnt by the question selector 108 during an online training process. The term "online" is used here to mean that the training takes place during operation of the information retrieval system 100 to retrieve content items 110.

The information about the probabilities stored in memory 102 may comprise statistics (such as mean and variance) of probability distributions, samples from probability distributions or other information about probabilities. In some cases the information about the probabilities stored in memory 102 is held in the form of a graphical model or neural network based model.

The search component 104 comprises a ranking algorithm for searching the index 128 to retrieve a ranked list of items from the index which are relevant to a query. Any well known ranking algorithm may be used. In some cases, the ranking algorithm is part of the question selector 108 as described below.

The user interface 106 is a graphical user interface such as on a touch screen or an augmented-reality display, or the user interface 106 is an auditory interface, or any type of user interface 106 which is capable of presenting questions to a user and receiving answers to those questions from the user. Examples of views of a graphical user interface provided by user interface 106 are given in FIGS. 1A to 1E and these are examples only and are not intended to limit the scope of the technology.

The index 128 stores links, references or addresses to individual content items 110 in an ordered manner. The order used is related to one or more features of the individual content items. For example, the index stores, for each content item, details of features of that content item where the features are from a known set of features used by the index.

The question selector 108 comprises one or more algorithms which when executed using a computing device select one or more of the questions from store 102. In some examples the question selector 108 is adaptive in that it learns how to select questions which will facilitate search. This is done by learning probabilities associated with the questions as described in more detail below. In some examples the question selector 108 is static, that is, not adaptive and selects one or more of the questions using a measure of expected information gain computed with reference to the indexed items as explained below. Where the question selector 108 is static the questions it selects are the same for the same indexed items. Where the question selector 108 is adaptive, the questions it selects potentially differ over time for the same indexed items.

As mentioned above, the question selector may comprise the ranking algorithm. In this case, the ranking algorithm uses a probability distribution over the items.

The information retrieval system is able to reduce the burden of user input since the question selector selects questions which are presented to the user. The user interface 106 presents the questions and optionally presents potential answers to the question(s) such as "yes", "no", "don't know". The user then simply selects a candidate answer to the question(s) using a single selection action such as a touch, mouse click, voice command or other input. In this way the user does not have to enter complex query terms or to use a complex search syntax to enter search criteria into the information retrieval system. The questions are presented to the user using natural language in some cases which makes the information retrieval system easy to use. In some cases the questions are presented using icons which facilitate input of answers to the information retrieval system since these are intuitive and take up little space on a touch screen of a resource constrained device.

The information retrieval system is able to reduce the burden of user input because the number of times a user has to input queries to the information retrieval system is reduced. Without the information retrieval system described herein a user has to repeatedly enter queries in order to find an item which is challenging for the user to locate. By selecting and presenting questions to the user the user has a simple task of replying to the question(s) which involves a recognition task rather than the harder, more burdensome task of recall in which the user must recall facts about the item to be found and enter data about those facts into the information retrieval system.

The information retrieval system is able to efficiently find relevant search results through intelligent selection of the questions which guide search by the search component 104. This is achieved through use of expected information gain in some cases; that is, a question is selected based on how much information the method expects to gain by that question being answered. In some cases this is achieved through use of expected information gain and probabilities that users can answer individual ones of the questions. The information retrieval system estimates the probabilities in various different ways depending on a trade-off between the amount of resources/computation involved and the quality of the estimate. In a particularly efficient case, the probabilities are estimated and updated by observing frequency of occurrence of answers to individual questions. In a more complex case the probabilities are estimated by considering features of the items. For example, by observing frequency of features in items which are selected by users from search results of the information retrieval system.

In some examples, the information retrieval system is able to dynamically update the probabilities during use of the information retrieval system. This makes the information retrieval system perform well even where changes in the information retrieval patterns of users occur over time. By updating the probabilities the information retrieval system is able to become bespoke or tailored to a particular user, or group of users and so provide enhanced quality of information retrieval for the particular user or group of users.

Alternatively, or in addition, the functionality of the information retrieval system 100 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 1A:
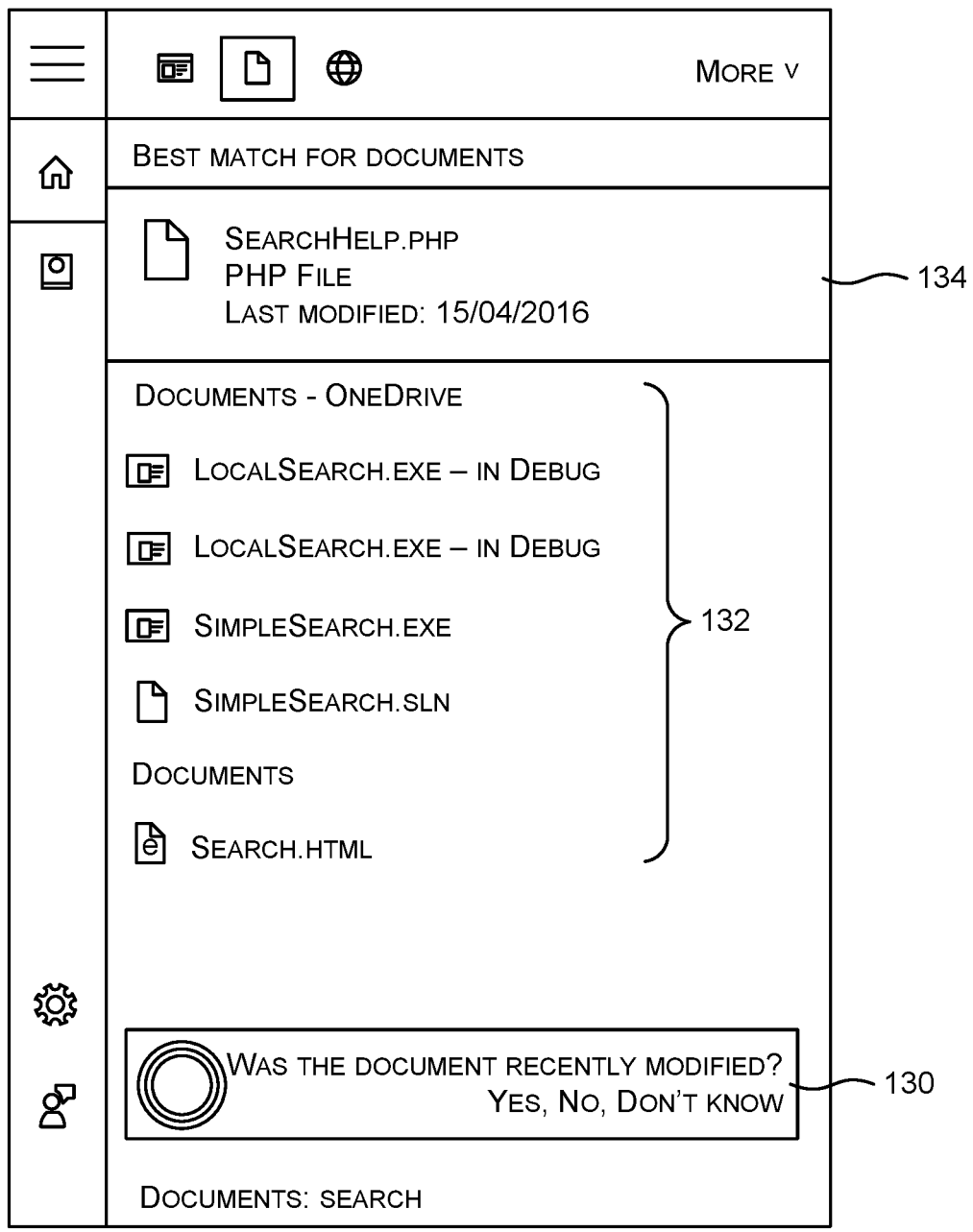
FIG. 1A is a schematic diagram of a first view of a user interface of the information retrieval system of FIG. 1.

FIG. 1A is a schematic diagram of a first view of a graphical user interface of the information retrieval system of FIG. 1 in the case a user is searching for a document named "Searchfilter.pptx". However, the user cannot recall the exact name of the document. Suppose the user has entered a search query such as "find documents with search in the title" and the information retrieval system has found the ranked list of documents 134, 132 where document 134 is a current best match. The document 134 which is the current best match is not the one the user is looking for. The question selector 108 selects a question from store 102 as described in more detail later in this document. The information retrieval system presents the question in field 130 of the graphical user interface which says "Was the document recently modified? Yes, No, Don't know".

Figure 1B:
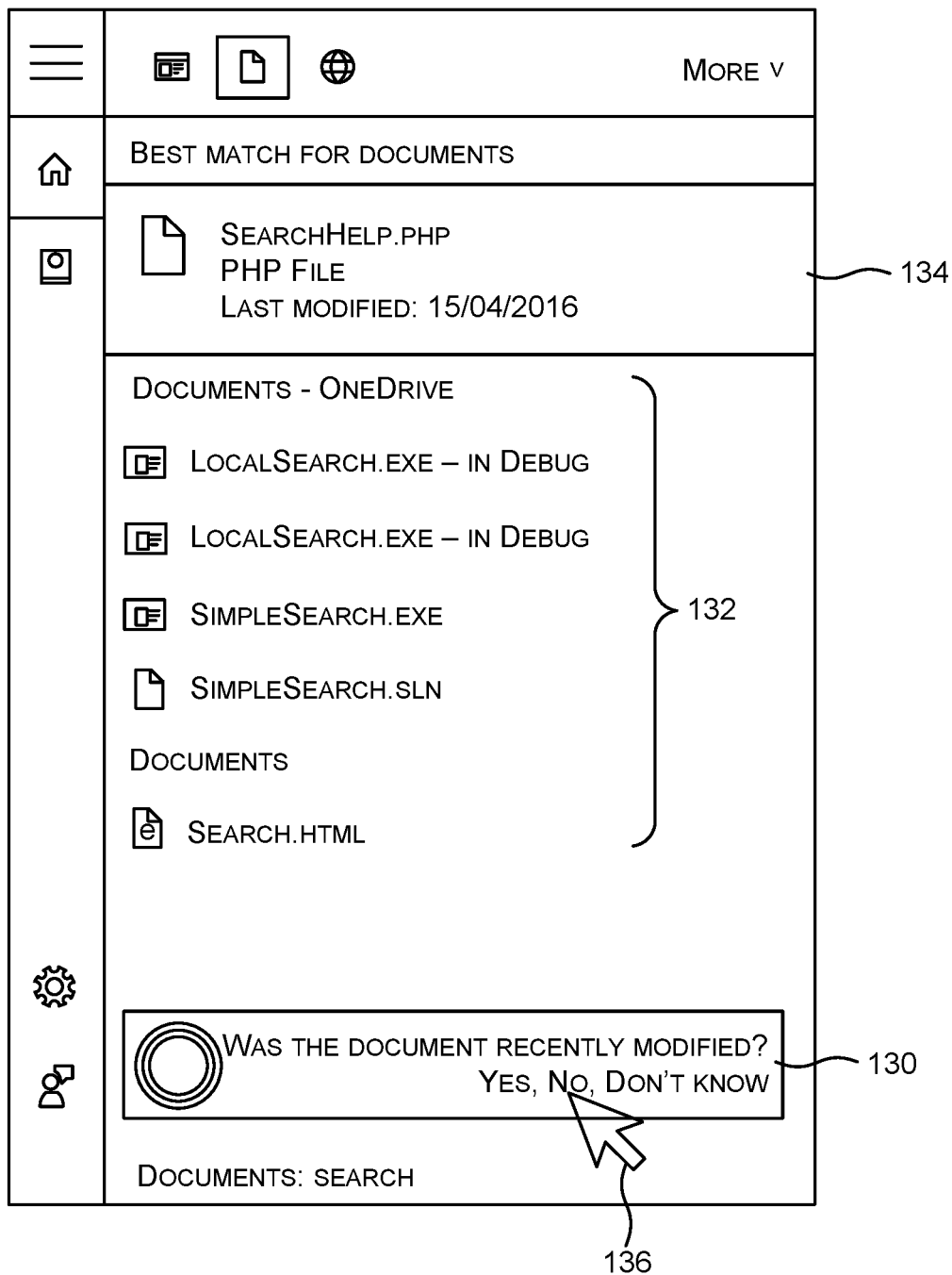
FIG. 1B is a schematic diagram of a second view of a user interface of the information retrieval system of FIG. 1.
Figure 1C:
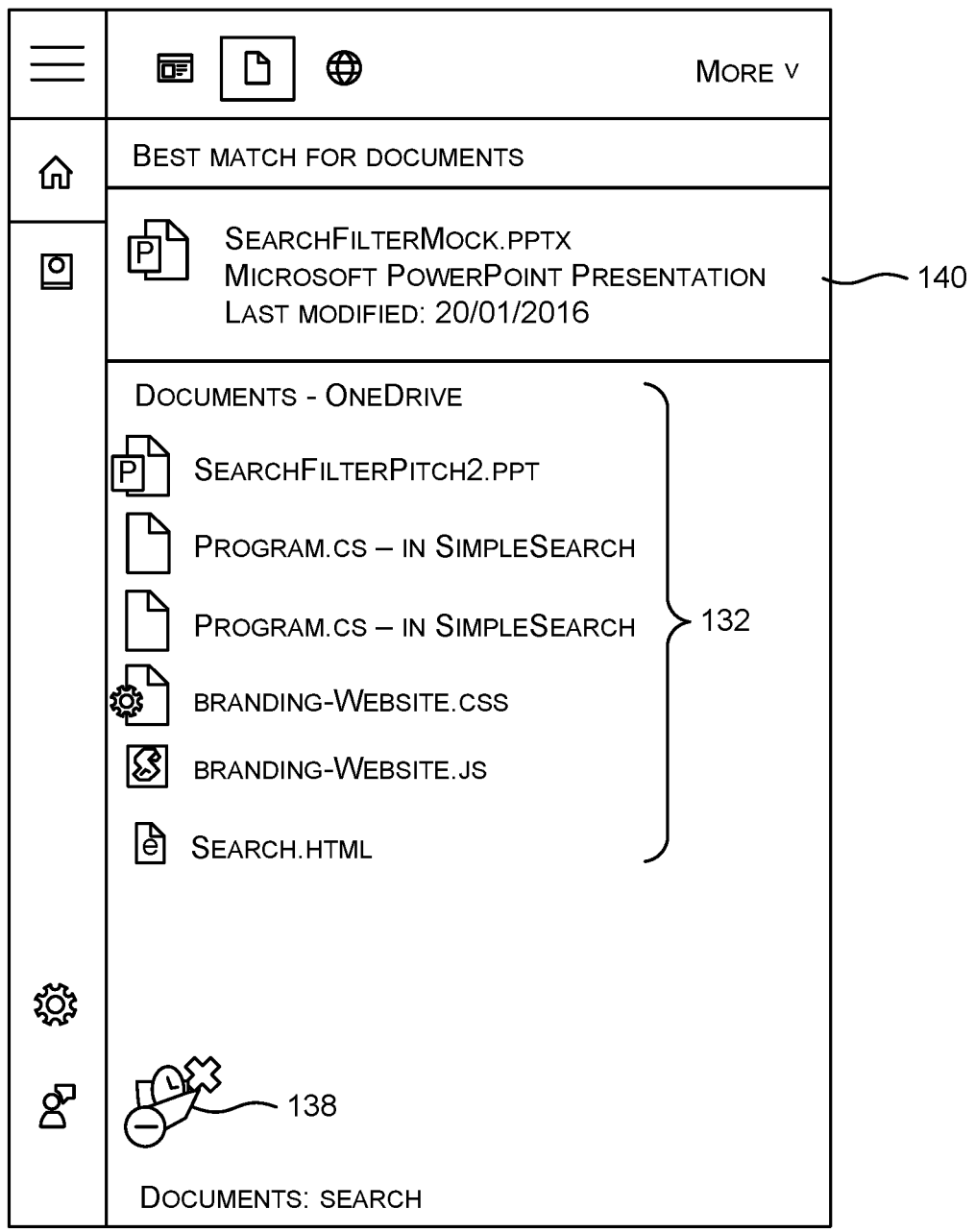
FIG. 1C is a schematic diagram of a third view of a user interface of the information retrieval system of FIG. 1.

FIG. 1B is a schematic diagram of a second view of the graphical user interface of FIG. 1A. Suppose the user selects "no" in answer to the question using cursor 136 in field 130 as illustrated in FIG. 1B. The answer is used by the search component 104 to update the search and the updated results are presented at the graphical user interface as indicated in FIG. 1C. As shown in FIG. 1C the best matching document is now a document called "searchfilter.pptx" in field 140 and this is the document the user is looking for. The documents in the ranked list of results 132 have been updated as compared with those in FIG. 1B. An icon 138 at the bottom of the graphical user interface indicates to the user that the search has applied a question relating to time (as the icon is a clock face) and that the question has been answered in the negative as indicated by the negative sign on the bottom left of the icon. To remove the influence of the answer on the search results the user is able to select a cross sign on the top right of the icon.

Figure 1D:
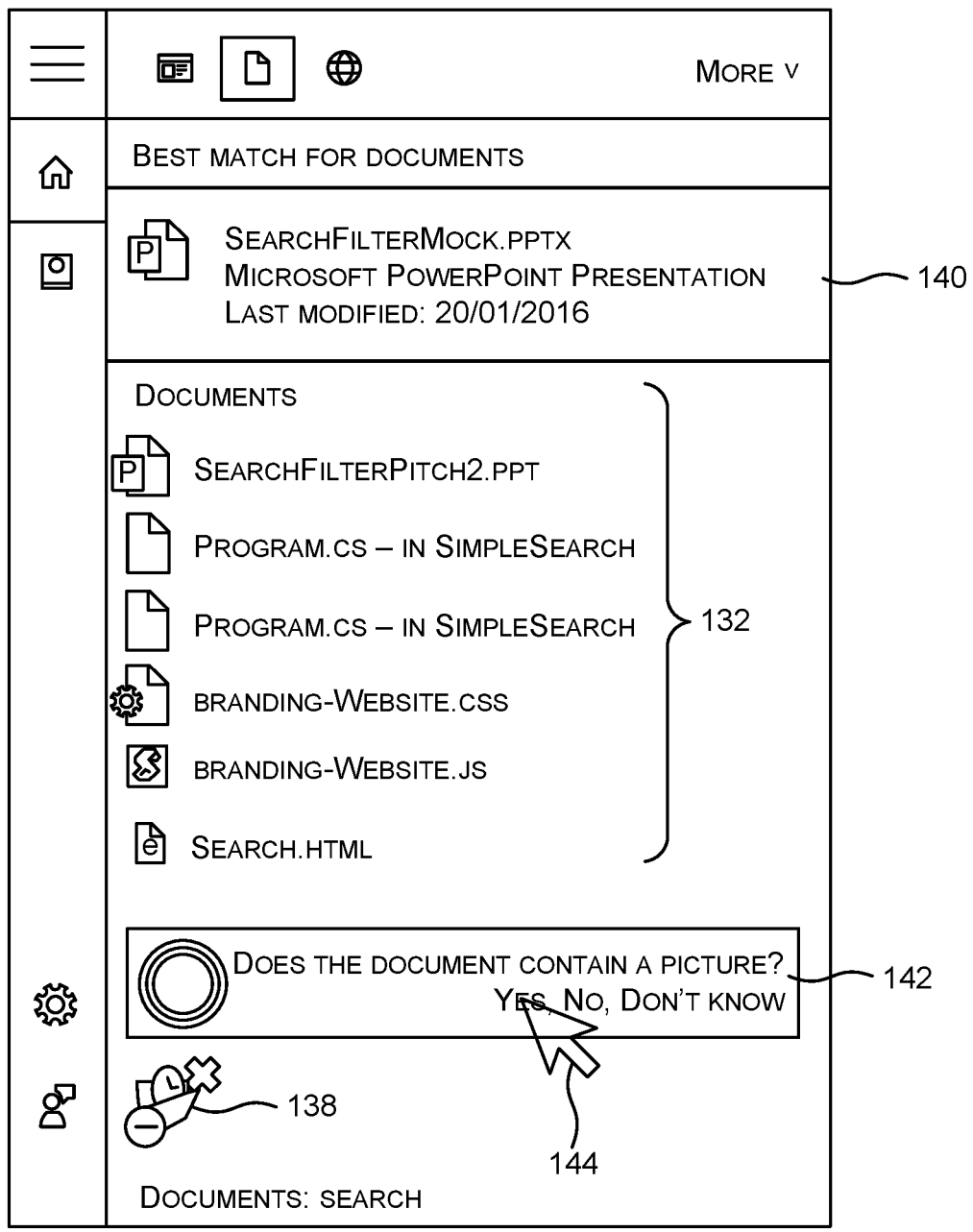
FIG. 1D is a schematic diagram of a fourth view of a user interface of the information retrieval system of FIG. 1.
Figure 1E:
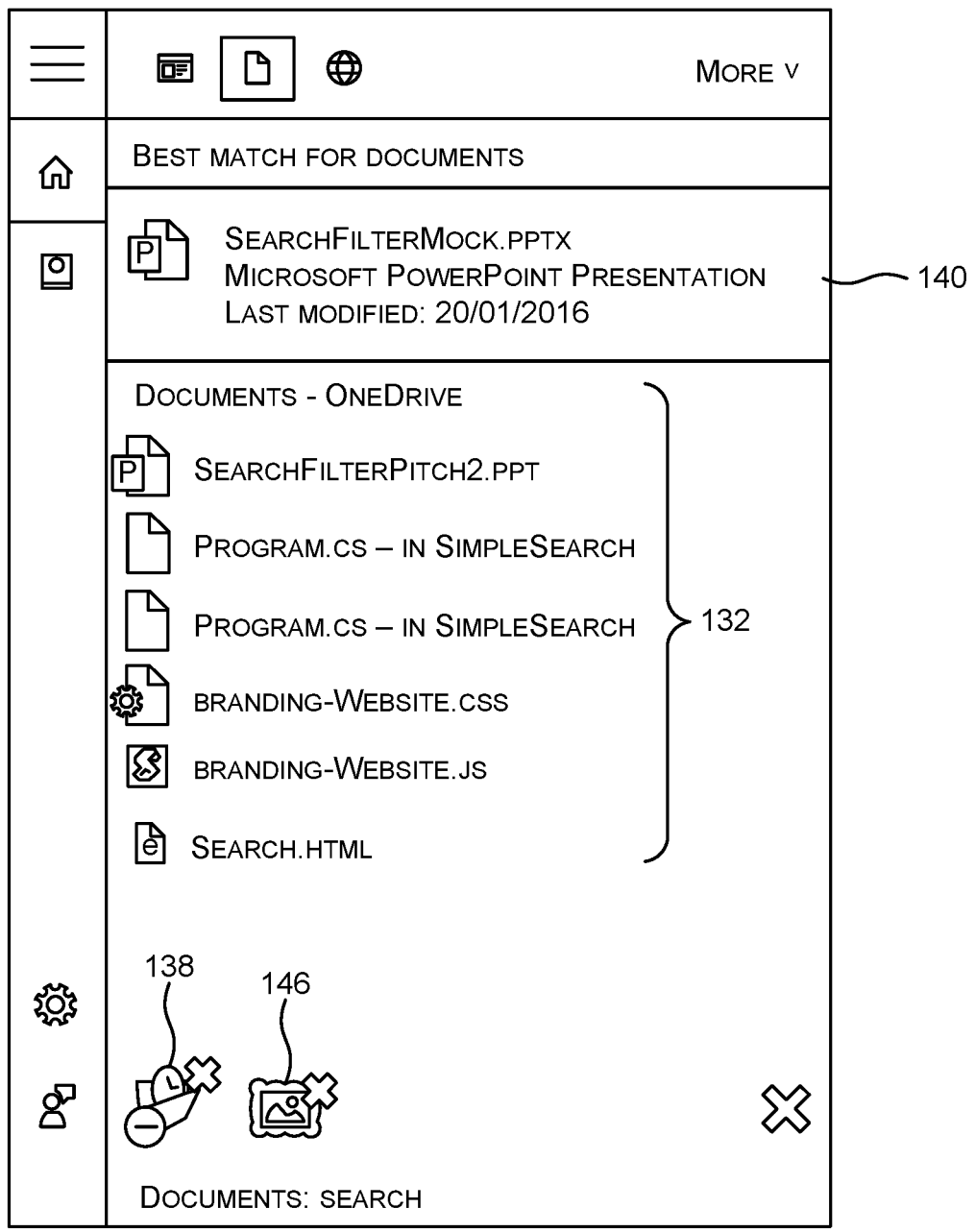
FIG. 1E is a schematic diagram of a fifth view of a user interface of the information retrieval system of FIG. 1.

The process of presenting questions and receiving answers is repeatable. Suppose the best matching document is "SearchDraft.pptx" as illustrated in field 140 of FIG. 1D. This is not the document the user is trying to find. The question selector 108 selects another question and presents that to the user via the user interface 106. In this example the question is "Does the document contain a picture? Yes, no, don't know" as indicated in field 142 of FIG. 1D. A question and answer relating to time has already been applied to the search as indicated by icon 138. The user proceeds to select "yes" using cursor 144 as indicated in FIG. 1D. The search component 104 applies the question and answer to the search and the updated search results give best matching document "Searchfilter.pptx" which is the correct document as indicated at field 140 of FIG. 1E. The graphical user interface displays the icon 146 to indicate that the question and answer regarding an image has been applied to the search and that the answer was positive since no negative sign is shown as for icon 138.

Figure 2:
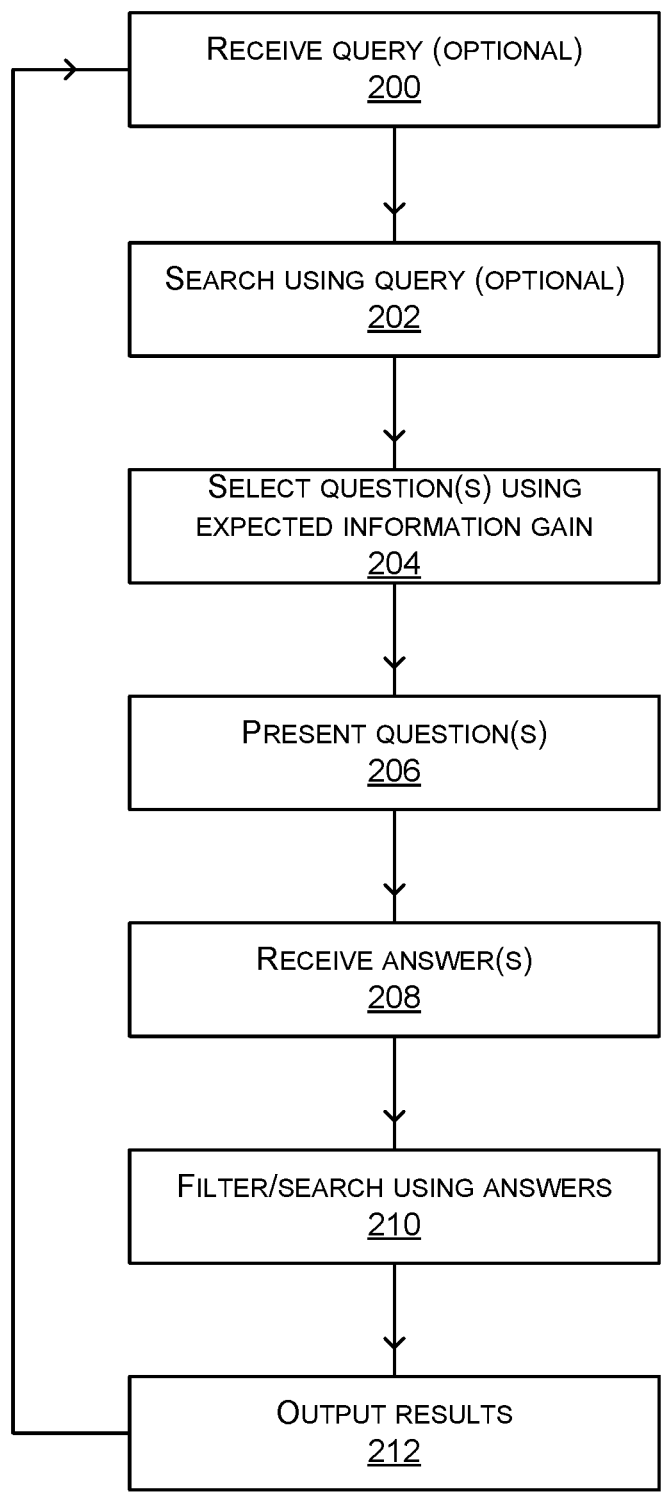
FIG. 2 is a flow diagram of a method of operation of the information retrieval system of FIG. 1.

FIG. 2 is a flow diagram of a method of operation at the information retrieval system 100, in the case that the question selector 108 is static (not adaptive). The information retrieval system optionally receives 200 a query from an end user. For example, the query is input by a user using user interface 106 or is received from another entity over communications network 120. The search component optionally searches 202 the index 128 using a ranking algorithm to find a ranked list of results relevant to the query. This ranked list of results is referred to as a candidate set of results herein and denoted with symbol C. In the case that steps 200 and 202 are omitted the candidate set C is all the questions in store 102.

In addition to, or as an alternative to, the ranking algorithm a probability distribution over the items is used to obtain the candidate set C. The probability distribution over the items is learnt from observations of prior interaction with the user.

The question selector 108 proceeds to select one or more questions from the store 102 of questions on the basis of an expected information gain of each question. The expected information gain is a measure of how well a question is able to divide the candidate set C of content items to be searched. The expected information gain may be computed using a measure of entropy such as a Shannon entropy for example. In the case that the ranking algorithm uses a probability distribution over the items, the computation of the expected information gain is achieved by computing an expected reduction of entropy in the probability distribution over the items.

One or more questions with a highest measure of expected information gain are selected by the question selector 108 and are presented 206 to the user using user interface 106. More than one question may be presented at the same time. In the case that the question selector 108 selects a plurality of questions to be presented together, these are selected in a manner which optimizes a measure of the plurality of questions, such as a measure of how likely it is that at least one of the plurality of questions can be answered.

If one or more answers are received 208 to the questions the candidate set is searched 210 using the questions and associated answers. This is done by using the search component 104 to search the index using the questions which received associated answers and/or by filtering results already retrieved by the search component at step 202. The search results are output 212 to the user by presenting them using user interface 106.

Using the expected information gain to select questions is a fast and efficient way for the question selector to select questions which is suitable for use on resource constrained devices. However, using only expected information gain to influence the selection of questions means that sometimes the questions selected by the question selector are unlikely to be answered by end users. This is because "answerability" of the questions is not taken into account. The "answerability" of a question can be thought of as related to the probability that a question can be answered by a user. For example, a question asking whether an item was created at an odd or an even second is likely to have high expected information gain but low probability that users can answer the question.

In order to improve the ability of the question selector to select questions which are "answerable" by end users, in some embodiments of the technology, the question selector takes into account probabilities that questions can be answered in addition to taking into account expected information gain. This is achieved by storing probabilities associated with individual ones of the questions or maintaining a model of these probabilities without creating an exhaustive list of the probabilities. The question selector is arranged in some examples to learn about the probabilities as the information retrieval system is used. However, it is not essential to learn about the probabilities online as in some cases the probability information is learnt in an offline process. In some examples the probabilities comprise, for each individual question, a probability that a particular user can answer that question. In some cases the probabilities comprise, for each individual question, a probability that any user can answer that question. The probabilities are used by the question selector 108 to select questions that are more effective at facilitating the search. The probability information is used by the question selector together with the expected information gain. By combining expected information gain and the probability information it is found that questions are selected which give high quality search results. For example, the number of rounds of questions and answers is reduced and the relevance of the search results is increased.

In an example, the expected information gain and the probabilities that users will answer the questions are combined using the following expression:

$$\text{Expected reward}_{s_i} = IG_i \times A_i$$

Which is expressed in words as, the expected reward of question S being answered by user i is equal to the information gain for user i times an estimate A of the probability that the question S can be answered by user i. The information gain for user i is computed exactly based on the current candidate set C.

The estimate A of the probability that the question S can be answered by user i is given by the number of times user i has answered the question divided by the total number of times the question has been presented. In some cases the expected reward is computed for each question so that there is a parameterized distribution, such as a Beta distribution or a multivariate Gaussian distribution representing an expected reward over all users for each question.

The above expression of the expected reward of question S being answered by user i is extended, in some examples as follows:

$$\text{Expected reward}_{S_i} = \sum_{Q \in A} IG_i(a) \times p(a)$$

which is expressed in words as the expected reward of question S being answered by user i is equal to, the sum over possible answers, of the information gain for user i who makes answer a times the probability of answer a being made.

Figure 3:
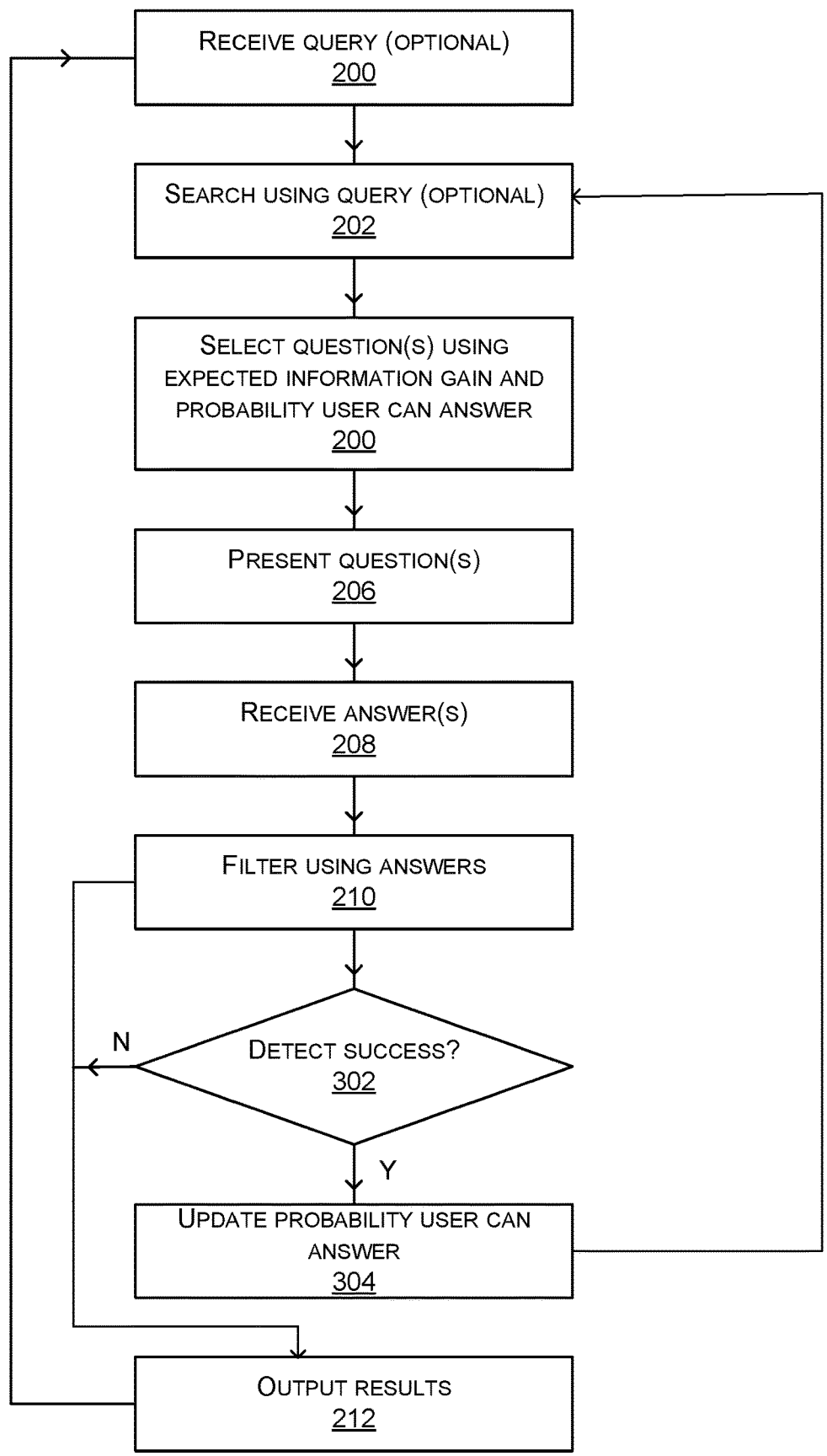
FIG. 3 is a flow diagram of another method of operation of the information retrieval system of FIG. 1.

FIG. 3 is a flow diagram of a method of operation at the information retrieval system 100 where the question selector uses expected information gain and probabilities that users can answer individual ones of the questions. As for FIG. 2 the information retrieval system optionally receives 200 a query and searches 202 using the query to obtain a candidate set of content items. The question selector selects 300 one or more questions using a measure of the information gain of the individual questions and information about the probability that individual users, or users in general can answer the individual questions. The questions are presented 206 using the user interface 106, answers are received 208 and the search component filters or updates the candidate set using the answers and associated questions. If success is detected at check point 302 the process updates 304 the probabilities that the user(s) can answer. For example, the probabilities are one or more values stored in memory 102 with the associated questions or stored at any other location accessible to question selector 108. Once the probabilities that the user can answer are updated at process 304 the method returns to operation 202.

If no success is detected at operation 302 the process proceeds to operation 212 at which the results are output.

Detecting success at check point 302 is achieved by checking whether a user answered one or more of the presented questions. The answer is any of "yes", "no", "don't know" in some examples. However, the answer is a rating, or a selection of a category, or another type of answer in some cases. In the case that the probabilities are estimated using a count of the number of times a particular question is answered as described above, the update involves incrementing the count. In another example a multi-armed bandit algorithm is used by the question selector 108 to both select questions and to update the probabilities. For example, a bandit algorithm based on posterior sampling is used to: generate questions by sampling from a current reward distribution and selecting one or more questions that are optimal according to the sample; and to update the parameters of the distribution after observing user answers.

In order to improve accuracy of the estimate of the probability that a question can be answered, information about the features of the questions and items is taken into account. This is done by having a general feature affinity vector (denoted by the symbol f) across all users and/or a feature affinity vector (denoted by the symbol b) for each individual user. A user feature affinity vector is a list of numbers, one for each feature of a set of possible features, where each number represents how likely the user is to select a content item with that feature. A global feature affinity vector is a list of numbers, one for each feature of the set of features, where each number represents how likely any user is to select a content item with that feature. The values in the feature affinity vectors initialize to default values and are updated as the information retrieval system is used. For example, the values of feature affinities are incremented, using a learned model as content items are selected by users as part of the information retrieval process, indicating that these content items are correct outcomes of the search. The learned model comprises one or more of: a decision tree, a neural network, a linear model, or other learned model. The learned model is updates using a perception learning algorithm or any optimization or learning approach such as gradient descent or others.

In some examples the feature affinity vectors are used to compute a score for each user-item pair. The score which is a number expressing how likely a user is to be searching for the item. In some examples, the score is computed as a weighted aggregation of the user feature affinity vector and the global feature affinity vector. A prior probability over the items is defined which expresses how likely a given item will be the target of a search. The prior probability for an item is computed from the score for the item divided by the sum of the scores of all the items. In some cases, the prior probabilities are used to weight the items in the computation of the expected information gain of the question as described above.

It is not essential to compute the prior probability for an item as described in the paragraph immediately above as this may be achieved in other ways by observing user search behavior.

In some examples the question selector uses a multi-armed bandit algorithm to select the question(s) and to update the probabilities that the user(s) can answer the questions. This gives an efficient and effective implementation for the question selector which is suited for online operation on a resource constrained device such as a smart watch, smart phone or other resource constrained device.

Figure 4:
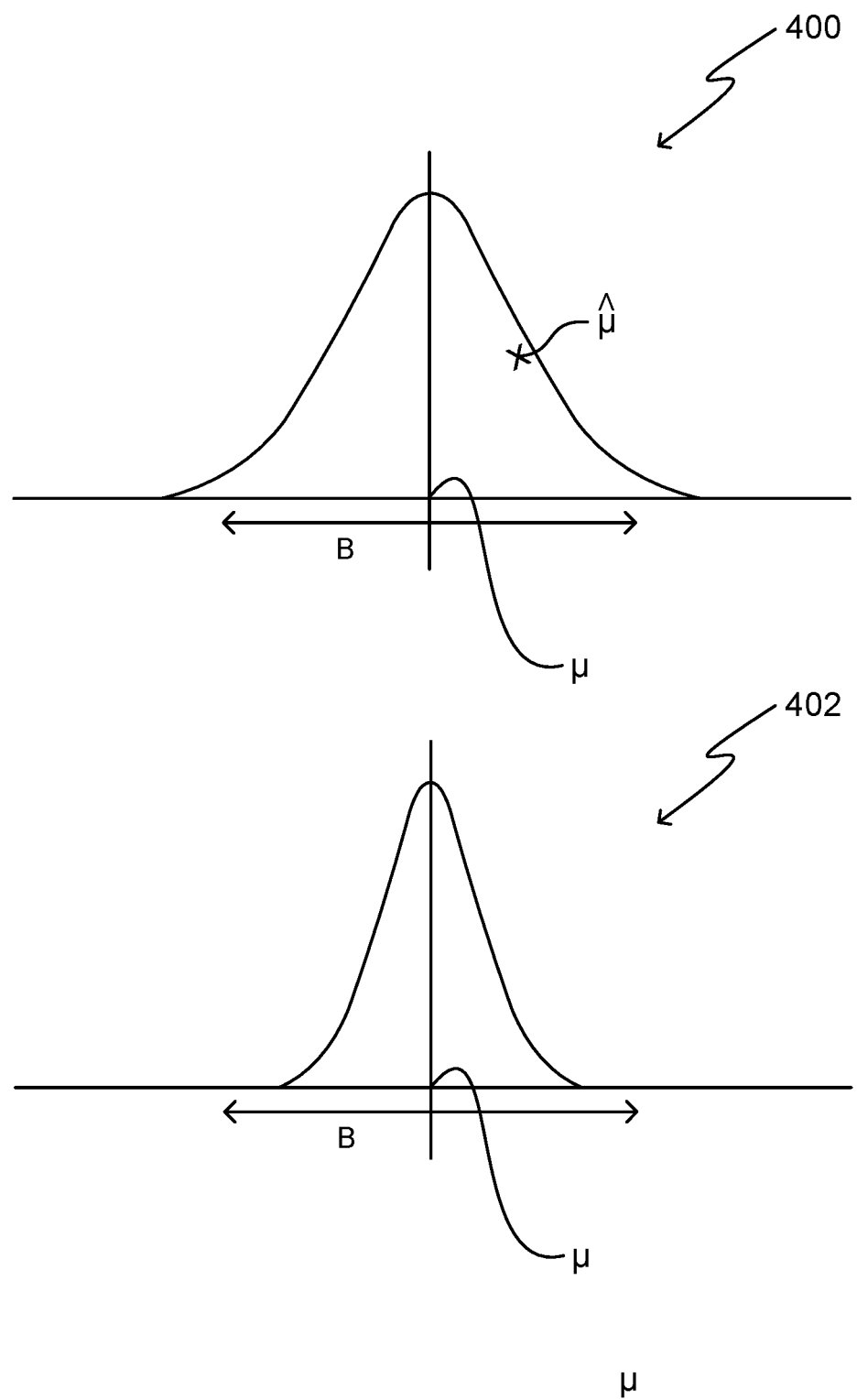
FIG. 4 is a schematic diagram of a probability distribution representing belief about answerability of a question by a user.

An example in which the question selector uses a multi-armed bandit algorithm is now described. In this example, the expected reward of a question is represented as a Gaussian distribution 400 (see FIG. 4) with mean $\mu$ and variance B as indicated in FIG. 4. Other types of distribution such as a Beta distribution are used in some cases to represent the expected reward. The memory 102 (or other store) holds statistics of a reward distribution for each question, or computes these when needed, and optionally for each combination of a particular user and a particular question. Initially the values of the statistics, such as a mean $\mu$ and variance B in the case of a Gaussian distribution are set to default values (as indicated by graph 400 in FIG. 4) and over time, as the information retrieval system presents questions and observes answers made by particular users these values are updated as indicated by graph 402 of FIG. 4.

Figure 5:
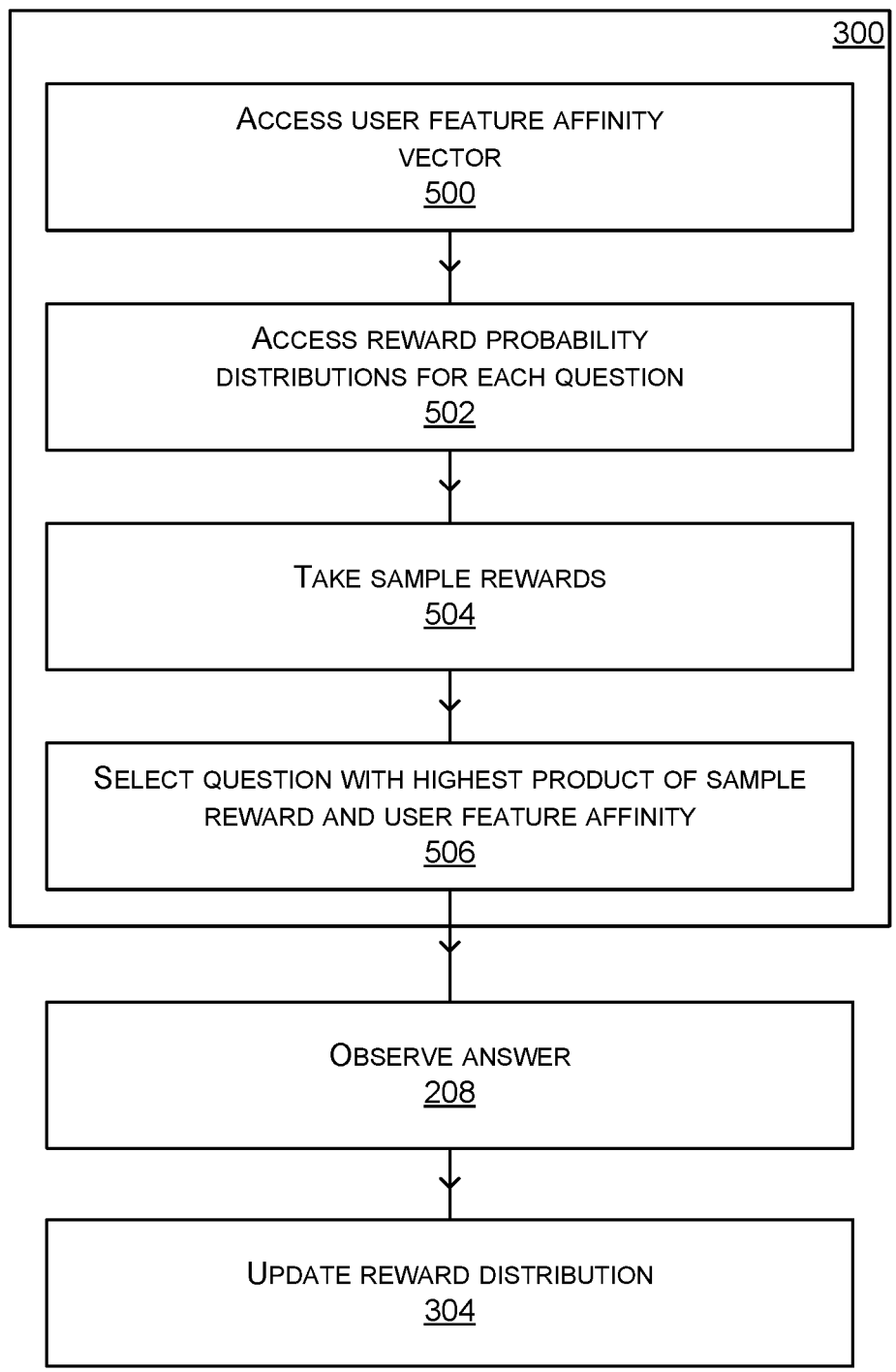
FIG. 5 is a flow diagram of part of the method of FIG. 3 in more detail.

The question selector 108 computes an expected reward for each question using the method of FIG. 4 where operation 300 is described as illustrated in FIG. 5. The question selector accesses 500 an answerability model which describes how likely users are to be able to answer questions. In an example the answerability model comprises user feature affinity vectors (global and user specific) however, this is not essential as other models of answerability may be used. The question selector accesses 502 a reward probability distribution for each question. A reward probability distribution takes into account the expected information gain and the answerability of the question for a given user, given by the answerability model. For a given question the question selector takes 504 a sample from the reward distribution of that question (as indicated by ft in FIG. 4) and multiplies that sample value by the feature affinity vector (such as the global feature affinity vector, or the user specific feature affinity vector). Assume for the sake of explanation that the sample and the feature affinity vector are single dimensional numbers. This gives a reward value for each question in the case the question is answered. The question selector 108 selects 506 the question which has the highest computed reward in a way that balances exploration and exploitation by using a known selection process such as: Thompson posterior sampling, upper confidence bound (UCB) or an $\epsilon$-greedy algorithm. To select multiple questions, the question selector 108 selects the top k questions by computed reward. This process of computing the rewards is extended to enable multidimensional values of the feature affinity vector and the sampled reward to be used.

The selected questions are presented and one or more answers are observed 208.

In the case that an answer to a presented question is observed the parameters of the reward distribution are updated 304 as now explained. If no answer is observed to the question then no update is done in some cases. In other cases the parameters of the reward distribution decay over iterations of the algorithm and/or over time to return towards their default values.

The variance of the reward distribution is updated by adding the feature affinity vector to it which is expressed as:

$$B=B+b(t)$$

Where B is the variance of the reward distribution and b(t) is the user feature affinity vector at time t.

The mean of the reward distribution is updated as follows:

$$f=f+(b(t) \times \text{answer})$$

$$\mu=B^{-1} \times f$$

Which is expressed in words as, the global feature affinity vector is updated by adding to the global feature affinity vector the user feature affinity vector at time t multiplied by the observed reward (where the observed reward is the answer to the question which was observed which is a zero in the case of no answer and a 1 in the case of an answer for example); and the mean of the reward distribution is equal to the inverse of the variance of the reward distribution times the updated global feature affinity vector.

Using the above update procedures the question selector is able to update the memory 102 or other store holding the parameters of the reward distributions for the questions. These parameters are then available to the question selector when it selects future questions. In this way the question selector is adaptive and is able learn belief about reward experienced by a user when a given question is answered as part of an information retrieval task.

In some cases the reward distribution is a Beta distribution and in that case, the update process comprises updating the parameters of the Beta distribution rather than updating a mean and a variance as described above.

Figure 6:
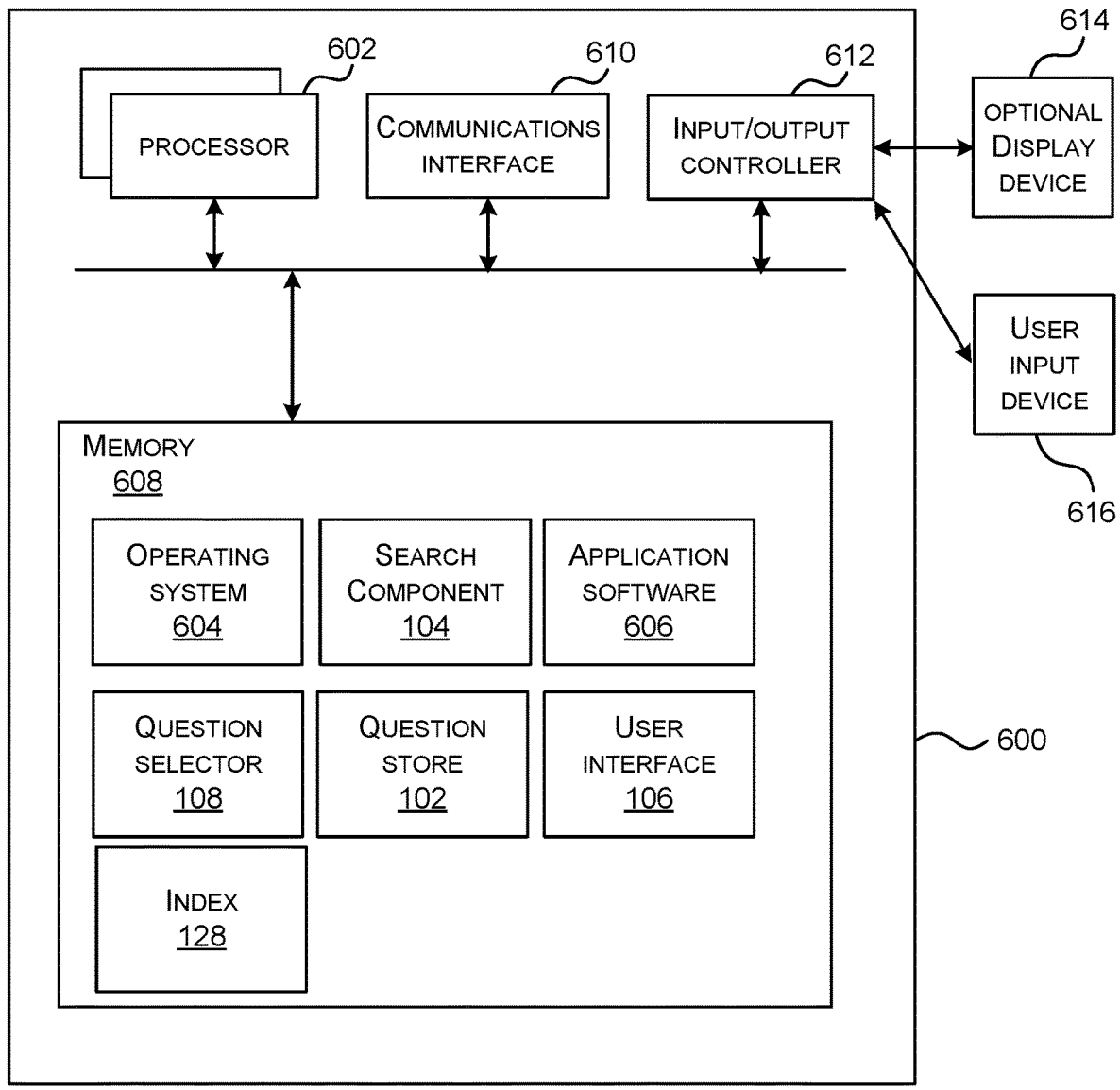
FIG. 6 illustrates an exemplary computing-based device in which embodiments of an information retrieval system are implemented.

FIG. 6 illustrates various components of an exemplary computing-based device 600 which are implemented as any form of a computing and/or electronic device, and in which embodiments of an information retrieval system are implemented in some examples.

Computing-based device 600 comprises one or more processors 602 which are microprocessors, controllers or any other suitable type of processors for processing computer executable instructions to control the operation of the device in order to search for items in a collection of items by selecting questions to facilitate the search. In some examples, for example where a system on a chip architecture is used, the processors 602 include one or more fixed function blocks (also referred to as accelerators) which implement a part of the method of any of FIGS. 2 to 5 in hardware (rather than software or firmware). Platform software comprising an operating system 604 or any other suitable platform software is provided at the computing-based device to enable application software 606 to be executed on the device. A search component 104 as described with reference to FIG. 1 is available at the computing based device and comprises one or more search algorithms such as ranking algorithms for searching an index 128 of items held at the computing based device or at another entity in communication with the computing based device. A user interface 106 is available at the computing based device and comprises computer executable instructions to implement a graphical user interface, an audio interface or any other type of user interface. A question store 102 at memory 608 of the computing based device 600 stores questions and optionally probabilities associated with the questions. In some cases the question store 102 holds user feature affinity vectors, global feature affinity vectors, statistics of reward distributions and other parameters. A question selector 108 at the computing based device gives the functionality of the question selector 108 described with reference to FIG. 1.

The computer executable instructions are provided using any computer-readable media that is accessible by computing based device 600. Computer-readable media includes, for example, computer storage media such as memory 608 and communications media. Computer storage media, such as memory 608, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 608) is shown within the computing-based device 600 it will be appreciated that the storage is, in some examples, distributed or located remotely and accessed via a network or other communication link (e.g. using communication interface 610).

The computing-based device 600 also comprises an input/output controller 612 arranged to output display information to a display device 614 which may be separate from or integral to the computing-based device 600. The display information may provide a graphical user interface. The input/output controller 612 is also arranged to receive and process input from one or more devices, such as a user input device 616 (e.g. a mouse, keyboard, camera, microphone or other sensor). In some examples the user input device 616 detects voice input, user gestures or other user actions and provides a natural user interface (NUI). This user input may be used to answer questions, input queries, view search results. In an embodiment the display device 614 also acts as the user input device 616 if it is a touch sensitive display device. The input/output controller 612 outputs data to devices other than the display device in some examples, e.g. a locally connected printing device.

Any of the input/output controller 612, display device 614 and the user input device 616 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

An information retrieval system comprising:

a memory storing an index of items, each item having one or more features of a plurality of possible features;

wherein the index includes, for each item, an indication of the features of that item; and wherein the index is configured at least according to the features;

the memory storing a plurality of questions about the features of the items;

a question selector configured to select at least one of the questions on the basis of at least an expected information gain of the question with respect to the items; and a search component configured to search the index using one or more answers to the selected questions received from a user.

The information retrieval system described above wherein the memory stores information about probabilities associated with the questions, the probabilities representing likelihood that a question can be answered.

The information retrieval system described above wherein the memory stores the probabilities such that they are user specific.

The information retrieval system described above wherein the memory stores the probabilities such that they comprise probabilities which are general over many users.

The information retrieval system described above wherein the question selector updates the probabilities online during operation of the information retrieval system using observed answers.

The information retrieval system described above wherein the question selector computes the information about probabilities by counting numbers of times questions are selected and numbers of times questions are answered.

The information retrieval system described above wherein the question selector computes the information about probabilities by updating parameters of a probability distribution representing reward of an answer to a question.

The information retrieval system described above wherein the question selector computes the information about probabilities by using features of the questions and wherein the memory stores a feature affinity vector for a user, the feature affinity vector comprising a numerical value for each of a plurality of features of the items.

The information retrieval system described above wherein the question selector computes the information about probabilities by using a general feature affinity vector stored by the memory.

The information retrieval system described above wherein the question selector is configured to execute a multi-armed bandit algorithm to select the question and to update the information about the probabilities.

The information retrieval system described above comprising a user interface configured to present the selected question and to receive the answers to the question.

The information retrieval system described above wherein the answers include an indication that no answer can be provided.

The information retrieval system described above wherein the questions are natural language questions or icons.

The information retrieval system described above comprising a user interface configured to present the selected question together with potential answers to the selected question for selection by a user.

An information retrieval system for retrieving one or more items from a collection of items comprising:
a memory storing a plurality of questions about the items;
a processor configured to select a question from the memory using an expected information gain of individual ones of the questions with respect to at least part of the collection of items; the processor being configured to:
present the selected question;
receive an answer to the selected question from a user; and
search the collection of items to identify items which agree with the received answer.

The information retrieval system described above wherein the processor is configured to present the selected question using natural language or using an icon.

The information retrieval system described above wherein the processor is arranged to repeat the process of selecting a question, presenting the selected question and searching the collection of items.

The information retrieval system described above wherein the memory stores probabilities that a user can answer individual ones of the questions, and wherein the processor is configured to select the question using both the expected information gain and one or more of the probabilities.

The information retrieval system described above wherein the processor is configured to update the probabilities using the receive answer.

A computer-implemented method of retrieving at least one item from a collection of items comprising:
selecting, using a processor, a question from a plurality of questions about items in the collection using an expected information gain of individual ones of the questions with respect to the collection of items;
presenting the selected question to a user;
receiving an answer to the selected question from the user; and
searching the collection of items to identify items which agree with the received answer.

A computer-implemented method at an information retrieval system comprising:
storing, at a memory, an index of items, each item having one or more features of a plurality of possible features;
including in the index, for each item, an indication of the features of that item;
configuring the index at least according to the features;
storing in the memory a plurality of questions about the features of the items;
selecting at least one of the questions on the basis of at least an expected information gain of the question with respect to the items; and
searching the index using one or more answers to the selected questions received from a user.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An information retrieval system comprising:
    a memory storing:
        an index of items, each item having at least one feature of a plurality of possible features, wherein the index includes, for each item, an indication of the at least one feature of that item, and wherein the index is configured at least according to the at least one feature;
        a plurality of questions about the at least one feature of the plurality of items; and
        information about probabilities associated with the plurality of questions, the probabilities representing likelihood that a question can be answered;
    a question selector configured to:
        execute a multi-armed bandit algorithm to select at least one of the questions on a basis of an expected reward,
        wherein the selected at least one of the questions is based on the expected reward being greater than other of the plurality of questions,
        wherein the expected reward is equal to an expected information gain for the user of the selected at least one of the questions with respect to the items times an estimate of a probability that the user can answer the selected at least one of the questions,
        wherein the probability is a value determined by associating a profile of a user with the selected at least one of the questions, and
        wherein the gain is a measure of how capable the selected at least one of the questions is at dividing the items; and
        update the information about the probabilities based at least one the expected reward;
    a search component configured to:
        search the index using at least one answer received from the user to the selected at least one of the questions; and
        provide the user with a search result based on searching the index using the at least one answer.

2. The information retrieval system of claim 1, wherein the question selector is further configured to update parameters of a reward distribution based on the at least one answer.

3. The information retrieval system of claim 2, wherein the memory stores the probabilities such that they are user specific and the parameters of the reward distribution.

4. The information retrieval system of claim 2, wherein the memory stores the probabilities such that they comprise probabilities which are general over many users.

5. The information retrieval system of claim 2, wherein the question selector updates the probabilities online during operation of the information retrieval system using observed answers.

6. The information retrieval system of claim 2, wherein the question selector computes the information about probabilities by counting numbers of times questions are selected and numbers of times questions are answered.

7. The information retrieval system of claim 2, wherein the question selector computes the information about probabilities by updating parameters of a probability distribution representing a reward of an answer to a question.

8. The information retrieval system of claim 2, wherein the memory stores a feature affinity vector for a user, the feature affinity vector comprising a numerical value for each of a plurality of features of the items.

9. The information retrieval system of claim 8, wherein the question selector computes the information about probabilities by using the feature affinity vector stored by the memory.

10. The information retrieval system of claim 1, wherein a computation of the expected information gain is achieved by computing an expected reduction of entropy in a probability distribution over the plurality of items.

11. An information retrieval system for retrieving at least one item from a collection of items comprising:
    a memory storing a plurality of questions about the items and information about probabilities associated with the plurality of questions, the probabilities representing likelihood that a question can be answered;
    a processor configured to execute a bandit algorithm to select a question from the memory based on an expected reward, wherein the selected question is based on the expected reward being greater than other of the plurality of questions, wherein the expected reward is equal to an expected information gain for a user of individual ones of the questions with respect to at least part of the collection of items times an estimate of a probability that the user can answer the question, wherein the probability is a value determined by associating a profile of the user with the selected at question, and wherein the gain is a measure of how capable the question is at dividing the items;

the processor being further configured to:

present the selected question;

receive an answer to the selected question from the user;

search the collection of items to identify items which agree with the received answer; and provide the user with a search result based on searching the collection of items using the received answer.

12. The information retrieval system of claim 11, wherein the processor is configured to present the selected question using natural language or using an icon.

13. The information retrieval system of claim 11, wherein the processor is arranged to repeat the process of selecting a question, presenting the selected question and searching the collection of items.

14. The information retrieval system of claim 11, wherein the processor is further configured to update the probabilities using the received answer.

15. A computer-implemented method of retrieving at least one item from a collection of items comprising:

executing, using a processor, a bandit algorithm to select a question from a plurality of questions about items in the collection based on an expected reward, wherein the selected question is based on the expected reward being greater than other of the plurality of questions, wherein the expected reward is equal to an expected information gain of individual ones of the questions with respect to the collection of items times an estimate of a probability that a user can answer the question, wherein the probability is a value determined by associating a profile of the user with the selected question, and wherein the gain is a measure of how capable the question is at dividing the items;

presenting the selected question to the user;

receiving an answer to the selected question from the user;

searching the collection of items to identify items which agree with the received answer; and providing the user with a search result based on searching the collection of items using the received answer.

16. The computer-implemented method of claim 15, further comprising updating probabilities stored in a memory using the received answer.

17. The computer-implemented method of claim 16, wherein the updating comprises updating information about the probabilities associated with the plurality of questions, the probabilities representing likelihood that a question can be answered.

18. The computer-implemented method of claim 17, further comprising computing the information about probabilities by counting numbers of times questions are selected and numbers of times questions are answered.

19. The computer-implemented method of claim 17, further comprising computing the information about probabilities by using a feature affinity vector.

20. The computer-implemented method of claim 17, wherein providing the user with a search result comprises providing the user with the search result on a display.

* * * * *